Patented Nov. 2, 1943

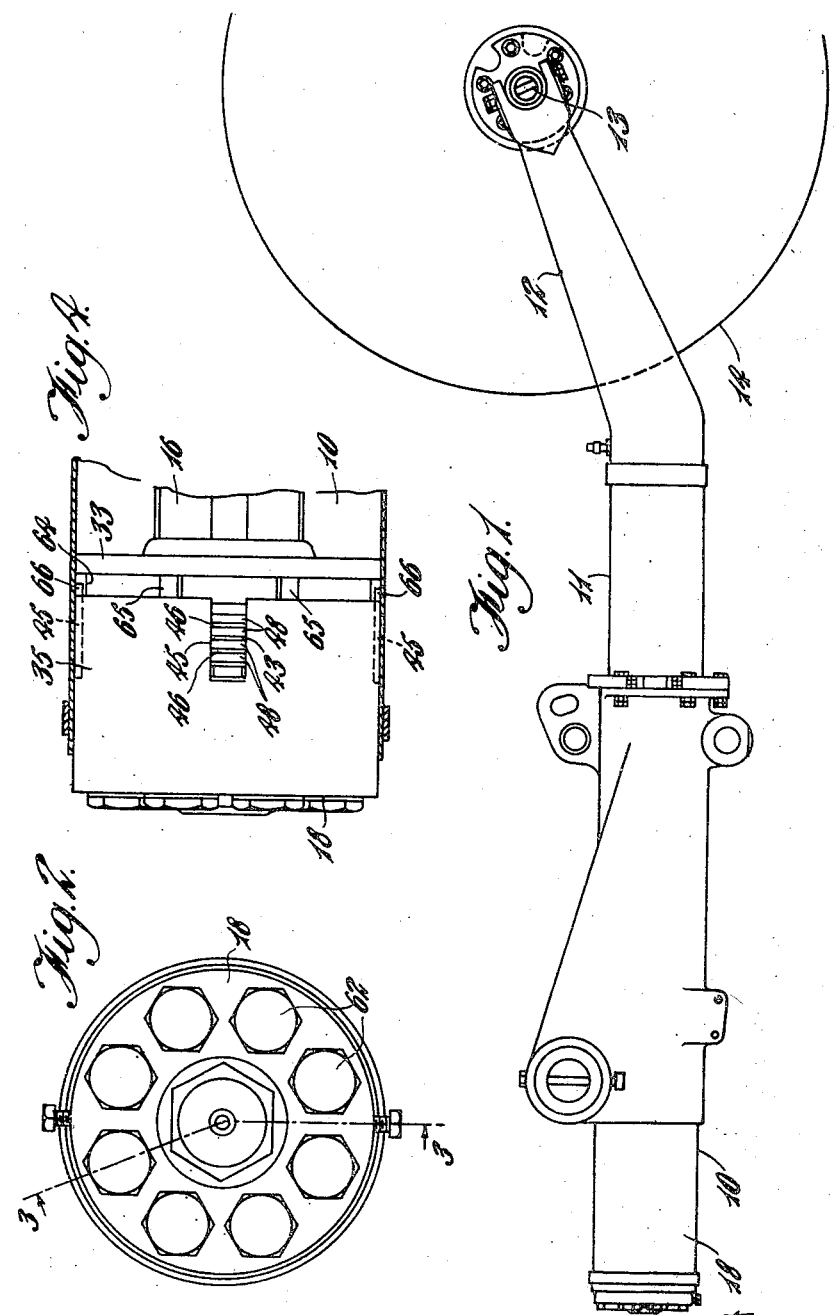

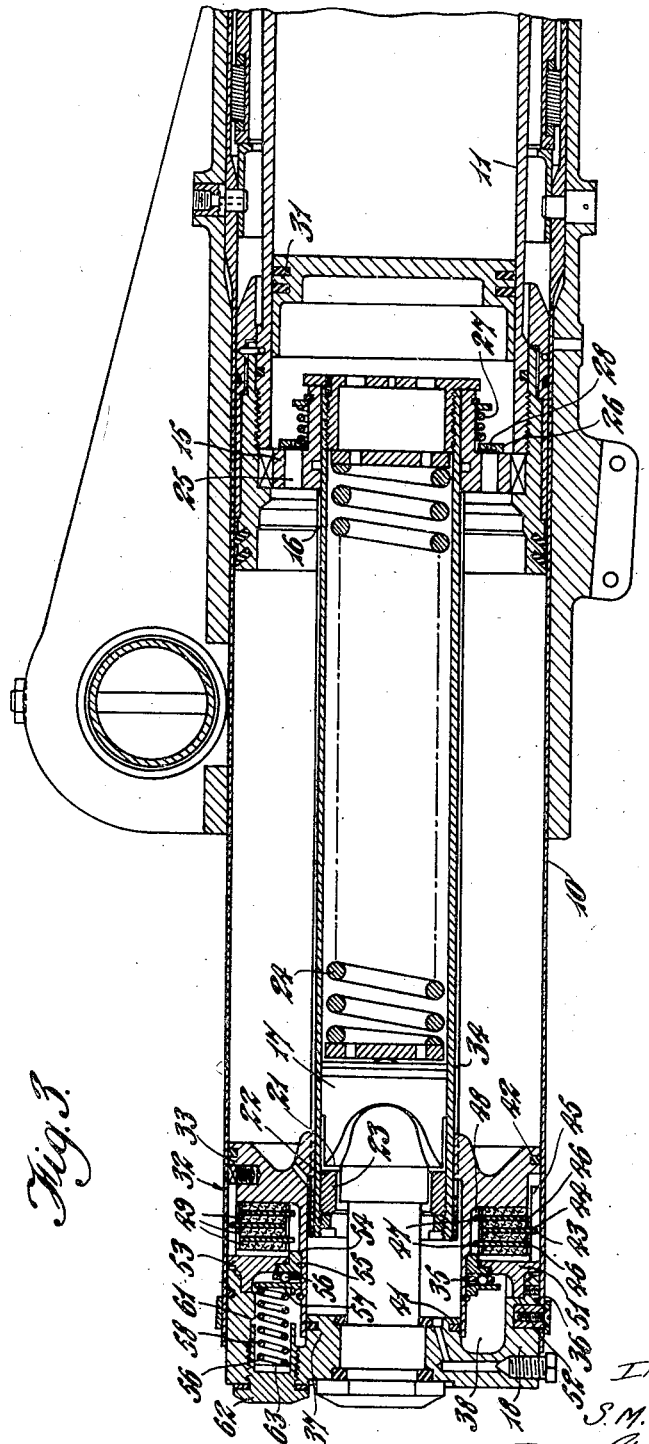

2,333,550

UNITED STATES PATENT OFFICE 2,333,550

LANDING GEAR FOR AIRCRAFT

Sydney Macdonald Parker, Leamington Spa, England, assignor to Automotive Products Company, Limited, Leamington Spa, England Application August 8, 1941, Serial No. 406,068
In Great Britain October 9, 1940

14 Claims. (Cl. 244—104)

The invention relates to landing gear for aircraft, and more particularly to mountings for landing wheels or equivalent landing members (such as endless tracks) which are capable of angular movement about a substantially vertical axis to permit the aircraft to travel readily in a curved path when supported by its landing gear on the ground. Such landing members are the tail wheel of an aircraft having the well-known form of landing gear comprising two or more transversely spaced main wheels forward of the centre of gravity, and a single wheel near the tail of the aircraft, and the nose wheel of the more recent form of landing gear commonly referred to as the "tricycle undercarriage."

These landing members, when deflected from their true fore-and-aft position by striking an obstruction or by any other cause, may tend to oscillate about their normal positions for a considerable period, throwing great strain on the aircraft structure, and rendering control difficult, and various measures have been proposed to damp out such oscillations, such as friction bands and other friction means, and hydraulic damping. The object of the present invention is to provide an improved friction damping device capable of giving a high torque to resist the oscillations of the landing member.

According to the invention, the mounting for a landing wheel or equivalent landing member comprises a resilient telescopic strut one element of which carries the landing member and is movable both telescopically and angularly with respect to the second element, the said second element being fixed in the aircraft, a friction clutch device between the two members of the resilient telescopic strut urged into engagement by the resilient element of the strut, and additional resilient means to disengage the clutch, when the loading of the resilient element falls below a predetermined limit.

The resilient telescopic strut may comprise cylinder and plunger elements, the friction clutch being mounted within the cylinder element between a fixed abutment therein and a piston slidable but nonrotatable with respect to the plunger element, the piston being subjected to the pressure of the resilient element in the strut. A self-centering cam mechanism may be provided between the two elements of the resilient telescopic strut to return said elements to a predetermined angular relation.

The cylinder element may be fixed in the aircraft and the plunger element may house the resilient element of the strut, the strut containing a damping liquid to control the telescopic movement thereof by passing through restricted orifices in the plunger head, and the pressure of the resilient element may be transmitted to the piston through the damping liquid. A stem slidable but non-rotatable with respect to the plunger element may carry one of a pair of self-centering cams, the other of which is secured to the cylinder head, and the piston may be mounted on splines on the said stem.

The piston may carry a sleeve adjacent its inner periphery, said sleeve being slidably engaged with a cylindrical wall on the cylinder head, fluid-tight packings being provided between said sleeve and cylindrical wall and between the piston and the cylinder wall, whereby there is provided a fluid-tight annular space to receive the clutch. The clutch may comprise a plurality of discs, alternate discs being rotationally coupled to the cylinder element of the strut, and the intermediate discs being rotationally coupled to the plunger element. The piston may be acted on by resilient means opposing the action thereon of the resilient element of the strut, such resilient means being for example a circumferential series of springs acting on the piston through a thrust bearing.

The invention is hereinafter described with reference to the accompanying drawings, in which—

Figure 1 is an elevation of a resilient telescopic strut incorporating a friction damping device in accordance with the invention;

Figure 2 is a view looking on the upper end of the strut, and on a larger scale than Figure 1;

Figure 3 is a section through the upper part of the strut shown in Figure 1, the strut being shown in retracted position, the section being taken on the line 3—3 of Figure 2; and Figure 4 is a fragmentary elevation of the upper end of the strut with the cylinder in section, illustrating a detail of the invention.

The resilient telescopic strut shown in Figure 1 is primarily designed to support the nose wheel of a tricycle undercarriage. The strut is of the oleo-pneumatic type, and comprises a cylinder 10 adapted to be fixedly mounted in an approximately vertical position in the aircraft, and a plunger 11 both slidable and rotatable in the cylinder 10. A fork 12 mounted on the plunger 11 carries an axle 13 for the wheel 14. As shown in Figure 3 the plunger 11 is hollow and is provided at its inner end with an annular head 15 splined internally to receive a splined tubular stem 16 which is thus slidable but non-rotatable with relation to the plunger. The stem 16 at its other end surrounds a spigot 17 projecting inwardly from the head 18 of the cylinder, opposed face-cam surfaces 21 and 22 being provided on the spigot 17 and on a sleeve 23 non-rotatably secured in the stem 16 respectively, and being urged into contact with each other by a spring 24 mounted within the stem, the cams tending to return the plunger to a definite angular position with respect to the cylinder. The annular head 15 of the plunger is formed with a plurality of apertures 25, and a ring 26 urged by a spring 27 against the inner face of the head 15 covers the holes, the ring 26 being formed with a plurality of very small holes 28.

A floating piston 31 slidable in the plunger 11 confines a quantity of compressed air in the lower part of the latter and separates it from damping liquid filling the cylinder and the upper part of the plunger. The damping liquid controls the oscillations of the plunger in the cylinder, passing fairly freely through the apertures 25 as the strut shortens, and having its return flow restricted by the ring 26 obturating the apertures 25, such return flow taking place only through the small holes 28. The extension stroke is thus powerfully damped.

The friction clutch device is accommodated in the upper end of the cylinder 10, and is generally indicated by the reference 32. An annular piston 33 sliding on the splines 34 on the stem 16 forms the inner end of a chamber housing the clutch, and, projecting from the piston towards the cylinder head, and integral with the piston, is a cylindrical sleeve 35 of slightly greater internal diameter than the central aperture in the piston. The cylinder head 18 comprises an outer cylindrical wall 36 fitting within the cylinder 10 and a short central inwardly projecting boss 37 between which is an annular recess 38. The end of the sleeve 35 enters this recess 38 and bears on the wall of the boss 37, a sealing ring 41 being provided in the wall of the boss. A second sealing ring 42 in the piston 33, bearing on the wall of the cylinder 10 completes the sealing of the chamber housing the clutch. The clutch 32 is of the multi-plate type, having a single thin metal disc 43 formed on its outer edge with four projections 44 entering axial slots 45 in the wall 36 of the cylinder head, two similar metal discs 46 one on each side of the disc 43 and formed with projections 47 on their inner edges to engage slots 48 on the sleeve 35, and four loose discs 49 of friction material alternating with the discs 43 and 46. An abutment plate 51 for the clutch bears on a shoulder 52 on the wall 36, and is rotationally located by projections 53 entering the slots 45, whilst the pressure plate is formed by the piston 33. The sleeve 35 is shouldered at 54 intermediate its ends and an L-shaped ring 55 abuts against the shoulder, this ring forming one race for a ball thrust bearing 56, the other race of which is formed by a flat annular ring 57. A number of springs 58 mounted in bores 61 in the head 18 bear on the ring 57, the springs taking their abutment on cap nuts 62 screwed into the outer ends of the said bores, the springs thus tending to urge the piston 33 away from the head 18 so as to release the clutch. The extent of this release movement is limited by the L-shaped ring 55 coming into contact with the abutment plate 51, in which position the parts are shown in Figure 3. The load exerted by the springs 58 may be adjusted by inserting shims 63 between the springs and the cap nuts 62.

In order to limit the angular movement of the plunger 11 in the cylinder 10, the end portion of the wall 36 on the cylinder head 18 is arranged to co-operate with stops on the piston 33. The piston 33 is reduced in diameter at 64 for a part of its length, and into this part are fitted two square-headed pins 65. The wall 36 is divided into four quadrants by the slots 45, and of these quadrants two adjacent ones are longer than the other two, the shorter quadrants being able to pass the pins 65 as the piston 33 rotates in the cylinder, whilst the longer ones extend into the path of the pins 65 and engage with them when the piston reaches a suitable angular position. The projecting ends of the two longer quadrants are shown at 66 in Figure 4.

The compressed air below the floating piston 31 of the strut exerts a pressure through that piston on the damping liquid, the pressure being in turn transmitted by the damping liquid to the piston 33 and so to the clutch 32. The pressure tends to press the plates of the clutch together and so to resist relative turning movement of the cylinder 10 and plunger 11, such resistance increasing with the air pressure, that is, with the load on the strut. Even when the strut is not supporting any part of the weight of the aircraft the compressed air is still exerting pressure on the floating piston and tending to engage the clutch, but the springs 58 are so adjusted that their combined pressure on the ring 57 just overcomes the pressure exerted on the piston 33 when the strut is loaded only by its own internal pressure and the piston 33 is moved away from the abutment 51 to free the clutch. As soon as any additional load is applied to the strut the springs 58 are overcome, and the clutch begins to engage.

When the aircraft is airborne, and there is no external load on the strut, the clutch 32 is disengaged by the springs 58, and the wheel is centred by the cams 21 and 22. As soon as the weight of the aircraft is to any extent borne on the wheel, the pressure in the strut rises, and, acting on the piston 33, overcomes the springs 58 to produce engagement of the clutch 32, the pressure producing such engagement increasing in proportion to the load on the strut. Thus in the case where braking is being applied to the wheels of the aircraft, tending to throw the weight forward on the nose wheel, under which conditions the oscillations of the wheel above referred to are very likely to occur, the angular movement is very strongly resisted. The self-centering cams 21 and 22 produce a continuous tendency to centre the wheel, whether the strut is loaded or unloaded.

The angular movement may be resisted by hydraulic means as well as by the friction device forming the feature of this invention, such hydraulic damping being, for example, provided in the manner described in British patent specification No. 503,807.

The relative angular movement of the plunger and cylinder is limited by the engagement of the ends 66 of the two longer quadrants of the wall 36 with the squareheaded pins 65, thus restricting such angular movement to about 70° in each direction from the normal fore-and-aft position of the wheel.

The clutch may evidently be of a type other than that described, being for example a single plate clutch or a cone clutch, and may be of the dry-plate type, or may be immersed in fluid, preferably the liquid employed for damping purposes in the shock absorber so that small leakages of such liquid into the clutch unit may have no deleterious effect.

Whilst the invention has been described with reference to a nose wheel mounted on an oleopneumatic shock absorber strut, it will be understood that the invention is also applicable to tail wheels for aircraft, that the landing member may be an endless track, ski, or other device equivalent to the wheel described, and that the resilient element of the strut may be a metallic spring acting on the piston of the clutch device directly, or through a liquid damping medium.

Throughout the specification, the one member of the resilient telescopic strut has been referred to as being fixed with respect to the aircraft. It is to be understood that the term is used only to indicate that this member is incapable of longitudinal or rotary motion under the influence of forces acting on the landing member, and does not exclude the possibility of the member being movable for retraction during flight.

What I claim is:

1. In a landing gear for aircraft a resilient strut, said strut being adapted for securement at one end thereof to an aircraft and having means on the opposite end for carrying a landing member, said strut comprising one member that is joined to the aircraft and a second member carrying the landing member secured to the first member for telescopic movement therewith and relative rotational movement, a disk type friction clutch connecting said members, resilient means for urging the clutch into engagement when a load is applied to the strut, and resilient means acting on the clutch for disengaging the clutch when the load is removed therefrom.

2. In a landing gear for aircraft a resilient strut, said strut being adapted for securement at one end thereof to an aircraft and having means on the opposite end for carrying a landing member, said strut comprising a cylinder member that is joined to the aircraft and a plunger member carrying the landing member telescopically engaging the cylinder member and adapted for relative rotation therewith, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, resilient means for urging the piston toward the clutch when a load is applied to the strut and additional resilient means acting on the clutch to disengage the clutch when the loading of the first resilient means falls below a predetermined limit.

3. In a landing gear for aircraft a resilient strut, said strut being adapted for securement at one end thereof to an aircraft and having means on the opposite end for carrying a landing member, said strut comprising one member that is joined to the aircraft and a second member carrying the landing member secured to the first member for telescopic movement therewith and relative rotational movement, a disk type friction clutch connecting said members, resilient means for urging the clutch into engagement when a load is applied to the strut, resilient means acting on the clutch for disengaging the clutch when the load is removed therefrom, and a self-centering cam mechanism disposed between the two elements and operable to return said elements to a pre-determined angular relation.

4. In a landing gear for aircraft a resilient strut, said strut being adapted for securement at one end thereof to an aircraft and having means on the opposite end for carrying a landing member, said strut comprising a cylinder member that is joined to the aircraft and a plunger member carrying the landing member telescopically engaging the cylinder member and adapted for relative rotation therewith, resilient means in said plunger adapted to absorb shocks to which the strut is subjected, damping means in said strut to control the telescopic movement of the two members, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, resilient means for urging the piston toward the clutch when a load is applied to the strut and additional resilient means acting on the clutch to disengage the clutch when the loading of the first resilient means falls below a predetermined limit.

5. In a landing gear for aircraft a resilient strut, said strut being adapted for securement at one end thereof to an aircraft and having means on the opposite end for carrying a landing member, said strut comprising a cylinder member that is joined to the aircraft and a plunger member carrying the landing member telescopically engaging the cylinder member and adapted for relative rotation therewith, resilient means in said plunger adapted to absorb shocks to which the strut is subjected, damping means in said strut to control the telescopic movement of the two members, said damping means comprising a fluid in said cylinder member and means defining inlet and outlet orifices through which the damping fluid is forced by the telescopic movement of the two members, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, resilient means for urging the piston toward the clutch when a load is applied to the strut and additional resilient means acting on the clutch to disengage the clutch when the loading of the first resilient means falls below a predetermined limit.

6. The invention as defined by claim 5 further characterized by the provision of a pair of cooperating cams secured respectively to the cylinder and plunger elements, whereby said elements are urged to return to a predetermined angular relation.

7. The invention as defined by claim 2 further characterized in that there is provided within the plunger element resilient means for said strut, damping means for said telescoping elements, said damping means comprising a damping fluid in a chamber defined by the cylinder, a cylinder head, and plunger member and means defining inlet and outlet orifices in the plunger head whereby the passage of the damping fluid therethrough is controlled to effect a damping of the telescopic movement of the members, the damping fluid acting as a medium through which the pressure of the resilient element is transmitted to the piston to actuate the friction clutch, a sleeve carried by the piston adjacent its inner periphery, said sleeve slidably engaging a cylinder wall on the cylinder head, fluid-tight packings between the piston and the cylinder wall whereby a fluid-tight annular space is formed to receive the clutch.

8. In a landing gear for aircraft a resilient strut, said strut being adapted for securement at one end thereof to an aircraft and having means on the opposite end for carrying a landing member, said strut comprising one member that is joined to the aircraft and a second member carrying the landing member secured to the first member for telescopic movement therewith and relative rotational movement, a disk type friction clutch connecting said members, said friction clutch comprising a plurality of disks, means for rotationally coupling alternate disks to the cylinder element and means for rotationally coupling the intermediate disk to the plunger element, resilient means for urging the clutch into engagement when a load is applied to the strut, and resilient means acting on the clutch for disengaging the clutch when the load is removed therefrom.

9. In a landing gear for aircraft a resilient strut, said strut being adapted for securement at one end thereof to an aircraft and having means on the opposite end for carrying a landing member, said strut comprising one member that is joined to the aircraft and a second member carrying the landing member secured to the first member for telescopic movement therewith and relative rotational movement, a disk type friction clutch connecting said members, said friction clutch comprising a plurality of disks, means for rotationally coupling alternate disks to the cylinder element and means for rotationally coupling the intermediate disk to the plunger element, a loose disk of friction material disposed between each pair of adjacent disks in the series, resilient means for urging the clutch into engagement when a load is applied to the strut, and resilient means acting on the clutch for disengaging the clutch when the load is removed therefrom.

10. In a landing gear for aircraft a resilient strut, said strut being adapted for securement at one end thereof to an aircraft and having means on the opposite end for carrying a landing member, said strut comprising a cylinder member that is joined to the aircraft and a plunger member carrying the landing member telescopically engaging the cylinder member and adapted for relative rotation therewith, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, resilient means for urging the piston toward the clutch when a load is applied to the strut and additional resilient means adapted to disengage the clutch when the loading of the first resilient means falls below a predetermined limit, said additional resilient means comprising a series of springs, a cylinder head forming abutments for one of their respective ends and a thrust bearing carried by the piston and forming an abutment for the other end of the springs.

11. In a landing gear for aircraft a resilient strut, said strut being adapted for securement at one end thereof to an aircraft and having means on the opposite end for carrying a landing member, said strut comprising a cylinder member that is joined to the aircraft and a plunger member carrying the landing member telescopically engaging the cylinder member and adapted for relative rotation therewith, a cylinder head in said cylinder, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, a sleeve made integral with said piston and extending axially toward the cylinder head and forming therewith a chamber for the friction clutch, resilient means for urging the piston toward the clutch when a load is applied to the strut and additional resilient means adapted to disengage the clutch when the loading of the first resilient means falls below a predetermined limit, said additional resilient means comprising a series of springs, a cylinder head forming abutments for one of their respective ends and a thrust bearing carried by the piston and forming an abutment for the other end of the springs.

12. In a landing gear for aircraft a resilient strut, said strut being adapted for securement at one end thereof to an air craft and having means on the opposite end for carrying a landing member, said strut comprising a cylinder member that is joined to the aircraft and a plunger member carrying the landing member telescopically engaging the cylinder member and adapted for relative rotation therewith, a cylinder head in said cylinder, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, a sleeve made intgral with said piston and extending axially toward the cylinder head and forming therewith a chamber for the friction clutch, an annular shoulder on said sleeve against which a series of springs act through said thrust bearing, resilient means for urging the piston toward the clutch when a load is applied to the strut and additional resilient means adapted to disengage the clutch when the loading of the first resilient means falls below a predetermined limit, said additional resilient means comprising the series of springs, a cylinder head forming abutments for one of their respective ends and a thrust bearing carried by the piston and forming an abutment for the other end of the springs.

13. In a landing gear for aircraft a resilient strut, said strut being adapted for securement at one end thereof to an aircraft and having means on the opposite end for carrying a landing member, said strut comprising a cylinder member that is joined to the aircraft and a plunger member carrying the landing member telescopically engaging the cylinder member and adapted for relative rotation therewith, stop means carried by the telescoping elements for limiting the relative rotational movement, a friction clutch mounted within the cylinder member, a fixed abutment in said cylinder member adapted to engage one side of the friction clutch, a piston within said cylinder that is slidable but non-rotatable therein with respect to the plunger element for engaging the opposite side of said friction clutch, resilient means for urging the piston toward the clutch when a load is applied to the strut and additional resilient means acting on the clutch to disengage the clutch when the loading of the first resilient means falls below a predetermined limit.

14. The invention as defined by claim 2 further characterized in that stops are provided on the cylinder wall and piston for limiting the relative angular movement of the cylinder and plunger elements, said piston having a portion of its length of reduced diameter, a pair of radially projecting stops carried by the reduced portion of said piston, a sleeve integral with the cylinder head and projecting for a part of its circumference into the space around said reduced portion, whereby the angular movement of the plunger element in the cylinder element is limited by the engagement of said extended part of the sleeve with the radially projecting stops.

SYDNEY MACDONALD PARKER.